United States Patent Office 3,219,870
Patented Nov. 23, 1965

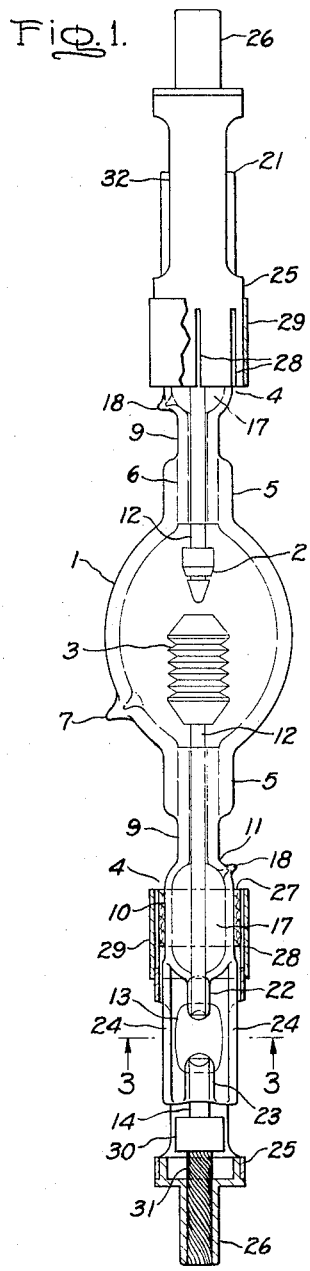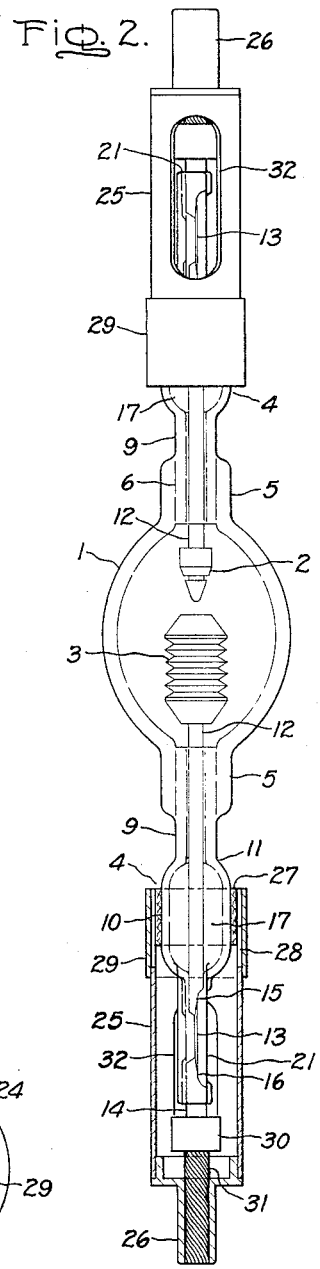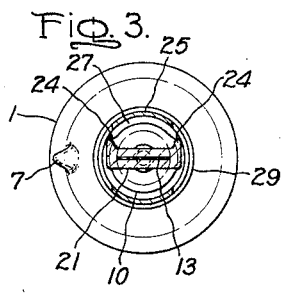

3,219,870
HIGH PRESSURE DISCHARGE LAMPS
SEAL AND BASE
Klaus Gottschalk, Cleveland Heights, Ohio, assignor to
General Electric Company, a corporation of New York
Filed June 14, 1963, Ser. No. 287,825
6 Claims. (Cl. 313—220)

This invention relates to high pressure discharge lamps utilizing pinch seals at opposite ends and is more specifically concerned with the basing of such lamps.

The invention is particularly useful in connection with high wattage compact source lamps intended for use in optical systems. For such applications, the lamp must be accurately mounted in a fixture in which it is held and positioned by its bases. An example of such a lamp is a high pressure xenon lamp comprising a thick-walled generally spherical quartz envelope or bulb wherein the discharge takes place across a relatively short interelectrode gap. The electrodes are supported on inleads extending through relatively long necks or stem tubes on opposite sides of the bulb. It is to these stems that the bases for mounting the lamp and for making circuit connections to the inleads must be attached.

Heretofore it has been the practice to seal the inlead through the stem by means of a graded seal. For instance, using a tungsten rod for the inlead, four intermediate glasses might be used proceeding from the inner end of the stem which is fused to the quartz bulb, to the outer end where the seal to the tungsten inlead rod is made. Such a seal is relatively fragile and its manufacture presents severe problems in connection particularly with the matching of the intermediate glasses. It would be much preferable to use a quartz-to-molybdenum pinch seal because it is less complicated to make and does not require the same degree of skill in its manufacture. Also the pinch seal is stronger and more rugged.

For the type of lamp in question, there has been developed a generally cylindrical or shell-like metal base which extends over a substantial portion of the stem. These bases are generally satisfactory and it is desired to retain them; another reason for retaining them is to make the new lamps using pinch seals interchangeable with the older style of lamp using graded seals. Therefore the object of the invention is to provide a construction whereby generally cylindrical bases may be conveniently mounted on and attached to pinch seal necks or stems.

The quartz at the pinch seal is flattened in cross section and generally bar-shaped. However, it is rather irregular and varies considerably in shape and I have found it impractical to mount a cylindrical shell base directly thereon. In accordance with my invention, I have overcome this problem by extending beyond the pinch, part of the large diameter tubing wherein the pinch is formed. This provides a section of tubing of circular cross section interposed between the pinch seal and the smaller diameter tubing that guides the inlead or electrode rod and which is fused to the bulb. The shell base is then slipped over the pinch seal portion of the stem up to the large diameter tubing section to which it is fastened as by cementing or clamping. Thus the relatively fragile pinched portion of the stem or neck is enclosed within the shell base and protected by it, and the mechanical attachment is made to the more rugged wall tubing section of circular cross section which is quite adequate in strength to support the lamp.

For further features and advantages and for a better understanding of the invention, attention is now directed to the following detailed description of a preferred embodiment to be read in conjunction with the accompanying drawing. The features of the invention believed to be novel will be more particularly pointed out in the appended claims.

In the drawing:

FIG. 1 shows a high pressure compact source xenon lamp embodying the invention wherein the cylindrical base at one end has been sectioned to show the internal construction.

FIG. 2 is a similar view of the same lamp rotated 90° on its longitudinal axis.

FIG. 3 is a cross sectional view through the pinch seal and base taken along line 3, 3 of FIG. 1.

The illustrated lamp corresponds to a type having an over-all length including the bases of 36.5 centimeters and rated at 2 kilowatts. It comprises a relatively thick-walled generally spherical quartz bulb 1 filled with xenon at several atmospheres pressure in which the arc discharge occurs between cathode 2 and relatively massive anode 3. The lamp is made by joining the stem assemblies 4 to the bulb by heating the short bulb neck portions 5 to collapse them onto the cylindrical ends of the stem tubes along the junction lines 6. Thereafter the bulb is exhausted and a xenon filling introduced through an exhaust tube which is finally tipped off at 7.

The stem or neck assembly comprises a thick-walled quartz tube 9 and a thinner-walled quartz tube 10 merging together at 11. The stem tube may be made by blowing up a suitable length of the thick-walled tube 9 to a larger inside diameter to form the thinner walled section 10, or alternatively separate pieces of quartz having the desired shape may be joined together. The inlead conductor comprises tungsten electrode rod 12, molybdenum foil 13, and molybdenum inlead pin 14 connected in series. The foil 13 is made from a piece of molybdenum sheet cut to size and electrolytically etched in a bath of sodium hydroxide in order to taper the edges. Flats are ground or milled into the ends of rod 12 and pin 14 as indicated at 15, 16 in order to provide larger contact-making surfaces for brazing to the foil 13. The joint is brazed using high frequency heating in a hydrogen atmosphere with a tab of iron as brazing material; the iron wets the molybdenum or tungsten very well and at the same time leaves the foil ductile and not embrittled.

After the lead assembly is brazed together, it is inserted into the stem tube in such fashion that the electrode rod 12 passes through the bore of the thick-walled tube 9 and the foil is located near the outer end of the thinner-walled tube 10. The bore of tube 9 is such that electrode rod 12, while passing freely therethrough, is mechanically supported thereby to maintain the axial alignment of the electrode in the completed assembly. Pinching is done using for instance four oxyhydrogen burners directed against the quartz tubing from all around while a nitrogen flow is maintained through the tubing and around the metal parts to prevent oxidation thereof. The nitrogen flow may be supplied through a tubulation on chamber 17 which is subsequently tipped off at 18. The quartz is driven in by the pressure of the flames, and finally is pressed down against the foil by movement of a pair of jaws which are closed and reopened in a fraction of a second to provide the generally bar-shaped cross section illustrated at 21 in FIG. 3. Preferably reliefs are provided at 22, 23 over the weld junctions to the foil. The width of the pinched portion 21 is allowed to exceed only very slightly the outer diameter of tube portion 10; the excess quartz may be extruded either into upstanding ears 24 (FIG. 3), resulting in a somewhat channel-shaped cross section as illustrated, or alternatively an I-beam shaped cross section may be used.

The solid tungsten electrodes 2, 3 are brazed to the ends of rods 12 in a hydrogen atmosphere. The stem press tube assemblies are then joined to the lamp by inserting them far enough to bring the front ends of tubes 9 approximately even with the inner ends of neck portions 5. The bore of neck portions 5 is originally large enough to allow the electrodes to be inserted through them into the bulb. A vacuum-tight joint is made by heating neck portion 5 to cause it to shrink and collapse down upon tube 9 of the stem assembly along junction lines 6. However, care is taken not to collapse tube 9 down upon electrode rod 12. In fact it is desirable to wrap a thin shim of molybdenum foil around electrode rod 12 to assure that no direct wetting to quartz takes place which might eventually result in shaling or cracking.

After the lamp components have been assembled and joined together, the processing of the lamp includes baking, exhausting and filling with xenon at the desired pressure. There is no hermetic seal where electrode rod 12 passes through the bore of tube 9, and chamber 17 formed by the uncollapsed portion of tube 10 is in communication with the bulb or arc chamber 1. Since the ionizable medium is xenon which is a noncondensible gas, this situation does not create any particular problem and the chambers 17 will simply contain xenon at the same pressure.

The shell-like metal bases each comprise a cylindrical portion 25 and a pin cap portion 26 projecting from the outer end; in the illustrated embodiment, the portions are distinct and brazed together. The cylindrical portion 25 is slipped over the end of the stem assembly so as to encompass the pinched portion 21 of the stem and extend over the uncollapsed tube portion 10. The inner end of cylindrical portion 25 of the base may be cemented to portion 10 by applying a ring of high temperature basing cement between the two which is then baked to set it. Alternatively, as illustrated in the drawing, a ring of asbestos tape 27 is wrapped around tube portion 10 so as to provide a heat-resistant slightly compressible material and build up the diameter to the point where it is equal to or slightly greater than the width of pinched portion 21. The inner end of cylindrical portion 25 of the base is provided with parallel slits 28 to form tines which are pressed down against the asbestos wrap by means of a clamping ring 29. The asbestos wrap and clamping ring arrangement may also be combined with a high temperature cement used to saturate the asbestos wrap, thereby achieving a very secure assembly.

The electrical connection from the inlead to the base shell is made by means of a sleeve connector 30 and stranded conductor 31, both the pin 14 and the stranded connector 31 being brazed to the sleeve 30 and the stranded conductor 31 in turn being brazed into pin cap 26. Ventilating apertures 32 may be provided in the base shell for more effective cooling of the inlead assembly, particularly the juncture between inlead pin 14 and molybdenum foil 13 where oxidation due to overheating is most likely to occur.

It will be seen from the foregoing description that an improved stem tube and base assembly has been provided which permits the conventional cylindrical base to be effectively combined with a stem tube assembly utilizing a pinch seal. The construction in accordance with the invention is strong and relatively easy to manufacture and allows lamps using the new and more desirable pinch seals to be interchangeable with the older style of lamps utilizing the more fragile graded seals. It will be appreciated that the preferred embodiment of the invention which has been described is intended as exemplary; the scope of the invention is to be determined by the appended claims.

What I claim as new and desire to secure by Letters Patent of the United States is:

1. An electric discharge lamp comprising a vitreous envelope having an electrode sealed and supported therein through a stem tube assembly, said assembly comprising a current inlead including electrode rod, foil conductor and outer conductor joined in series, a vitreous stem tube including a relatively small diameter thick-walled section joined to said envelope and having a bore accommodating said electrode rod, and a larger diameter thin-walled section joined to said smaller diameter section, the outer portion only of said larger diameter section being pinched down upon said foil conductor, and a base having a cylindrical portion overreaching said pinched portion and fastened to the unpinched portion of said larger diameter section.

2. An electric lamp as defined in claim 1 wherein the foil conductor is of molybdenum and is joined to the electrode rod and to the outer conductor by iron brazes.

3. An electric discharge lamp comprising a quartz bulb having electrodes sealed and projecting thereinto from opposite sides through stem tube assemblies, each assembly comprising a current inlead including electrode rod, foil conductor and outer conductor joined in series, a quartz stem tube including a relatively small diameter thick-walled section joined to said bulb and having a bore accommodating said electrode rod, and a larger diameter thin-walled section joined to said smaller diameter section, the outer portion only of said larger diameter section being pinched down upon said foil conductor, and a base having a cylindrical portion overreaching said pinched portion and fastened to the unpinched portion of said larger diameter section.

4. An electric discharge lamp comprising a quartz envelope having electrodes sealed and supported therein through stem tube assemblies, each assembly comprising a current inlead including electrode rod, foil conductor and outer conductor joined in series, a quartz stem tube including a relatively small diameter thick-walled section joined to said envelope and having a bore accommodating said electrode rod extending therethrough into said envelope, and a larger diameter thin-walled section joined to said smaller diameter section, the outer portion only of said larger diameter section being pinched down upon said foil in a confined pinch having a width not substantially greater than the unpinched portion, and a base having a cylindrical portion overreaching said confined pinch outer portion and extending over the unpinched inner portion and fastened thereto, and a connection between said outer conductor and said base.

5. An electric discharge lamp comprising a quartz bulb containing an uncondensible gas and having electrodes sealed and supported therein through stem tube assemblies, each assembly comprising a current inlead including electrode rod, foil conductor and outer conductor joined in series, a quartz stem tube including a relatively small diameter thick-walled section joined to said envelope and having a bore accommodating said electrode rod extending therethrough into said envelope, and a larger diameter thin-walled section joined to said smaller diameter section, the outer portion only of said larger diameter section being pinched down upon said foil in a confined pinch having a width not substantially greater than the unpinched portion, the unpinched inner portion forming a generally tubular chamber not hermetically sealed off from said bulb, and a base having a cylindrical portion overreaching said confined pinch outer portion and extending over the unpinched inner portion and fastened thereto, and a connection between said outer conductor and said base.

6. An electric discharge lamp as defined in claim 4 wherein a wrapping of heat-resistant material is provided around said unpinched inner portion and the inner end of the cylindrical portion of said base is tined and clamped down upon said wrapping.

References Cited by the Examiner

UNITED STATES PATENTS

| 2,135,661 | 11/1938 | Hagen et al. | 174—50.61 |
| 3,093,768 | 6/1963 | Ayres | 339—144 |

FOREIGN PATENTS

| 476,488 | 12/1937 | Great Britain. |
| 817,908 | 8/1959 | Great Britain. |

GEORGE N. WESTBY, *Primary Examiner.*

F. A. ADAMS, *Assistant Examiner.*